Patented Nov. 1, 1938

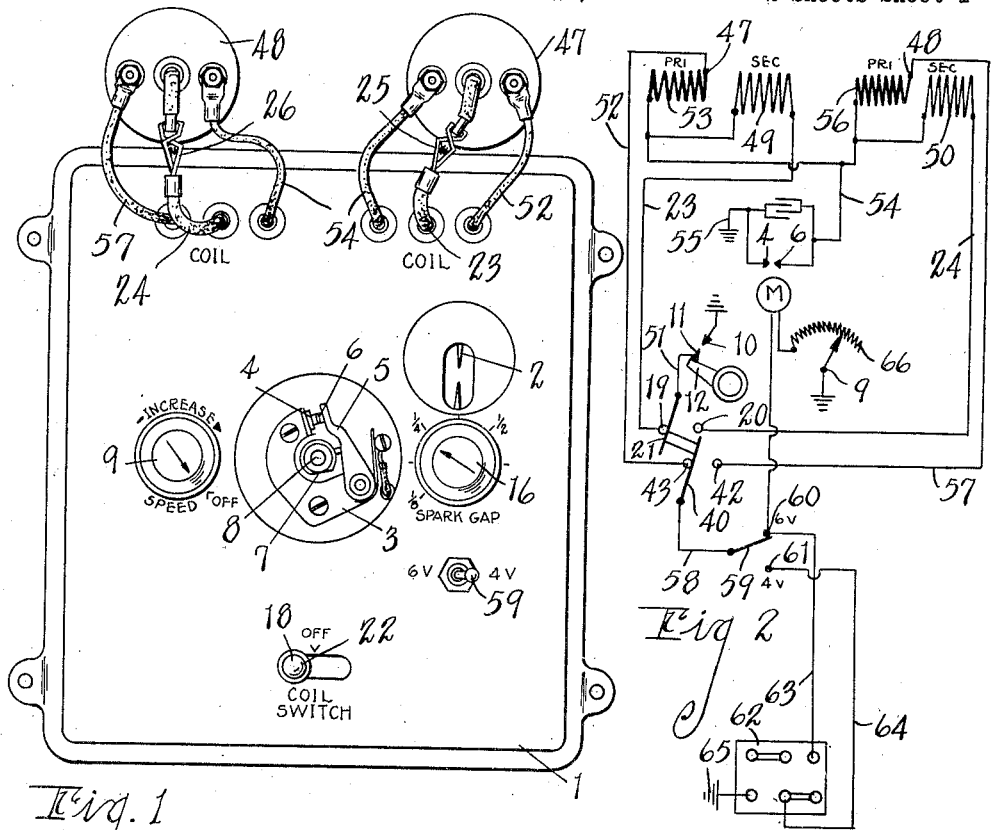

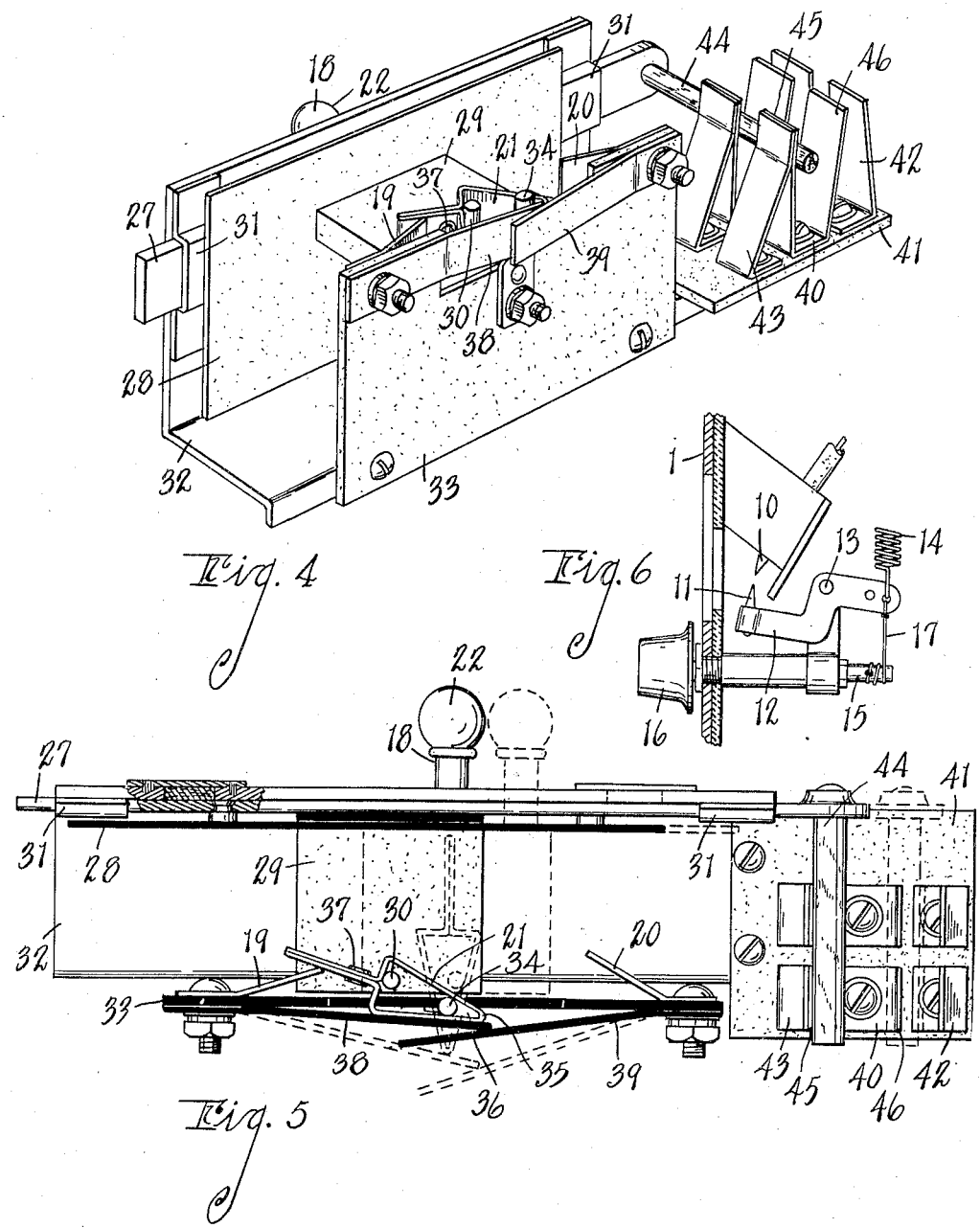

2,135,269

UNITED STATES PATENT OFFICE 2,135,269

METHOD OF AND APPARATUS FOR TESTING IGNITION COILS

Gerald H. Allen, Kalamazoo, Mich., assignor to Allen Electric & Equipment Co., Kalamazoo, Mich.

Application October 28, 1933, Serial No. 695,674

16 Claims. (Cl. 175—183)

The objects of this invention are:

First, to provide an improved method and apparatus for practical testing of the ignition coils of an internal combustion engine.

Second, to provide such an apparatus that is simple and cheap in construction and which permits accurate testing.

Third, to provide such an apparatus that may be used to test the coil against a master coil without varying the conditions under which the test is operated other than to change the coils, and in which the comparison is made instantaneously so as to eliminate the compilation of data.

Fourth, to provide such an apparatus that gives a comparative test under operating conditions.

Fifth, to provide such a method in which the coil to be tested is compared with a master coil by determining the characteristics of operation of both coils and instantly changing from one coil to the other to compare the characteristics without the necessity of compiling data or relying upon the memory of the operative.

Sixth, to provide such a method that can be used while the coil is operating under conditions substantially identical with those under which it is used.

Seventh, to provide such a method that is simple and substantially free from error.

Other objects and advantages will appear from the description to follow. The invention is defined in the claims. A structure embodying the features of my invention is illustrated in the accompanying drawings, in which:

Fig. 1 is an illustration of a switch board on which I carry out my test, showing the coil to be tested and the master coil connected for a test.

Fig. 2 is a wiring diagram showing the set up used in making the test shown in Fig. 1.

Fig. 3 is a wiring diagram showing the test, utilizing the engine in which the coil is used to assist in comparison.

Fig. 4 is a perspective view of a switch employed by me in carrying out my invention.

Fig. 5 is a plan view of the switch shown in Fig. 4.

Fig. 6 is an adjustable spark gap for use in making the test.

In conducting the test I provide a switch board 1 having thereon an adjustable spark gap 2, a breaker mechanism 3 comprising a stationary contact 4, a movable arm 5 carrying the contact 6, and a cam 7 for making and breaking the circuit. The cam is mounted on a drive shaft 8 which is driven by any suitable motor which is not shown but is indicated at M in Fig. 2. The motor is provided with a suitable change speed mechanism which is operated by a knob 9 on the board, as illustrated.

The spark gap 2 is adjustable and is shown in detail in Fig. 6. The point 10 is stationary and is grounded as indicated in Fig. 2. The point 11 is adjustable so that varying lengths of gap may be provided for testing. The point 11 is mounted on a lever 12 pivoted at 13. A spring 14 tends to hold the point 11 away from the point 10 in open position. The points are moved together through a rod 15 which has a suitable knob 16 on the front of the board. A cord 17 is attached to the lever 12 to pull against the spring 14 to close the gap, and the gap is adjusted by turning the knob 16 and through it the rod 15 to wind the cord 17 on the rod 15, as will be understood from a consideration of Fig. 6.

18 is a double switch for selectively throwing into circuit both the primary and secondary windings of either the coil to be tested or a master coil. One switch controls the high tension current from the secondary and another the battery current that energizes the primary of the coils. The switch for controlling the high tension current from the secondary consists of contacts 19 and 20 and the movable member 21 which may be swung to contact either of the contacts 19 or 20. Wires or other suitable electrical connections 23 and 24 run from the contacts 19 and 20 and are provided respectively with clips 25 and 26 to permit connection to the secondary of the master coil and the coil to be tested. I have found that the specific switch illustrated is of special utility in handling the high tension current from the secondary of the coils because by means of this switch I can place the contacts 19 and 20 sufficiently far apart and sufficiently far from the member 21 to prevent arcing and at the same time accomplish the throwing of the switch with a very slight movement of the handle 22 which controls this switch and the switch for the current that excites the primary of the coils.

The construction consists of a sliding piece 27 which may be of metal or any suitable material, on which the handle 22 is mounted to project through a slot in the front of the board, as shown in Fig. 1. A sheet 28 of suitable insulating material insulates this slide from the switch members and a block 29 of insulating material projects from the back of the slide 27. A suitable pin 30 projects from the slide and acts to throw the member 21 from contact 19 to contact 20 as the switch is operated. The member 27 is mounted in suitable ways 31, as shown in Fig. 4. A flange 32 extends rearwardly from the board and carries an upright piece of insulating material 33 on which the contacts 19 and 20 and the pin 34 are mounted.

The member 21 consists of a strip of metal bent at its center at an acute angle, as at 35, at which point is provided a suitable bushing 36 to receive the pin 34 on which the member 21 is pivoted. The sides of the metal strip forming the member 21 diverge for a portion of their length and are then brought together and fastened by a suitable clip or the like 37, leaving a triangular space into which the pin 30 projects. Two strips of insulating material 38 and 39 extend along the upper edge of the insulating material 33 to contact with the member 21 to serve as springs to hold the member in position in contact with either the contact 19 or 20. It will be readily understood how the switch operates from considering Fig. 5 which shows the member 21 in dotted lines in a position half way between the contacts 19 and 20. The pin 30 is moved when the handle 22 of the switch is operated and contacts with what is shown in Fig. 5 as the right hand diverging side of the member 21 to swing it to the position shown. As the slide is moved to the right the member 21 is swung farther to the right and the springs 38 and 39 of insulating material tend then to urge the member 21 to a position similar to that shown in full lines in Fig. 5 but in contact with the contact 20. All of the material used in making this switch is standard stock material and the switch may be easily and simply assembled by unskilled labor, as will be readily understood and at the same time serves to handle the high tension current from the secondary coil in a very satisfactory manner.

The second switch for handling the current to excite the primary of the coils is of the construction shown at the right of Figs. 4 and 5. Two such switches are shown in the figure although only one is used. The other switch may be used for any other purpose. The switch itself consists of a U-shaped member 40 of spring brass riveted or screwed on an insulating base 41. Members 42 and 43, likewise of spring brass, are provided to make the other contacts of the switch, one of each of said members being connected in circuit with the primary of the master coil and the other in circuit with the primary of the coil to be tested. A rod 44 projects from the end of the slide member 27 and extends into the U of the U-shaped member 40. As the slide 27 is moved in one direction, one arm 45 of the U-shaped member 40 is swung into contact with the member 43, while a movement of the slide in the opposite direction contacts the member 46 of the U-shaped member 40 with the contact member 42.

It will be seen that by using this switch, it is possible to control simultaneously both the primary and the secondary circuits of the master coil and the coil to be tested, so that first one coil and then the other can be thrown into electrical connection with the other testing apparatus, and that the change from one coil to the other may be accomplished instantaneously without the necessity for changing electrical connections. It will be readily understood that other types of double switches may be used to accomplish the same result and my invention is not confined to the specific switch, although I have found it to be very satisfactory.

Fig. 2 is the wiring diagram for conducting one coil test with my apparatus. The connections 23 and 24 have been connected respectively to the master coil 47 and the coil to be tested 48. These connections run to the secondaries of the respective coils. In the diagram these secondaries are indicated as 49 and 50 respectively. The member 21 of the switch 18 is connected by a connection 51 to the movable point 11 of the adjustable spark gap. The secondary coils 49 and 50 are shown grounded, as is customary, by contacting with the primary of the coil. By moving the member 21 from contact 19 to contact 20 it is possible to selectively connect the secondaries 49 and 50 of the coils in circuit with the spark gap 2 as desired.

The member 43 is connected with an electrical connection 52 to one end of the primary 53 of the master coil 47, and the connection 54 runs from the other end of said primary coil to the breaker mechanism 3 which is grounded by a connection 55. The primary 56 of the coil to be tested is connected with the connection 57 to the member 42 and the other end of the primary coil is connected by the connection 54 to the breaker mechanism. The central member 40 of the switch controlling the primaries of the coils is connected by the connection 58 to a switch 59 which has two poles 60 and 61 connected respectively to a battery 62, the pole 60 being connected by a connection 63 to the battery to give a six-volt current and the pole 61 being connected by a connection 64 to give four volts through the system. It is thus possible to test the coil using either four volts or six volts to excite the primary, which gives an indication of the results to be obtained in starting the engine in which the coil is used, because at that time the battery provided in the usual internal combustion engine of the automobile, usually delivers about four volts, while it is being started. The battery 62 is grounded at 65.

In carrying out this test the master coil, which is a coil of known characteristics, is selectively connected as described so that both its primary and secondary may be put in circuit with the breaker mechanism and source of electrical energy while the secondary is in circuit with the adjustable spark gap 2. The coil to be tested is connected as shown so that it may be alternately thrown in the same circuit. The breaker mechanism 3 is then operated by the motor M and driven at constant speed. The speed may be changed by a rheostat 66 which is controlled by a knob 9 in a manner that will be understood by those skilled in the art.

In running the test the switch 18 is thrown to a position to put the master coil in circuit and as the mechanism is operated the adjustable spark gap is adjusted to the point at which the longest steady spark is obtained. The switch is then thrown while the motor is operating the breaker mechanism at constant speed to put the coil to be tested in the same circuit. This may be done instantaneously and the operator can then see whether the spark at the adjustable spark gap 2 is comparable with the spark given by the master coil. If the spark given by the coil to be tested is not as good as that given by the master coil, the tester knows that the coil needs attention or that it should be replaced in the engine where it is being used. This test has proven to be extremely valuable because the coils are both tested under exactly identical conditions in exactly the same circuit so that there is no chance for variation in carrying out the test. The master coil and the coil to be tested are both called upon to give the same performance under the same conditions of dampness or the like, and it is well known that it is practically impossible to get two spark gaps identical, so that a test made with more than one circuit is apt to be very inaccurate.

In examining the spark to determine the operation of the coils, the operator studies the characteristics such as the length of the spark and the crackle given as well as the appearance of the spark. It is possible, using my method and apparatus, to shift from one coil to the other instantaneously while watching the sparks so that a very satisfactory comparison can be made, because it is not necessary to take down data or to carry a memory of just how the first spark appeared while an apparatus is being connected to the second coil. It is also possible to check back and forth from one coil to the other to make the test exhaustive.

It will be appreciated by those skilled in the art that although an adjustable spark gap is the simplest means of studying the characteristics of the spark, other means of studying the characteristics can be used. In recent years neon tubes have been used satisfactorily, and if desired a neon tube can be operated with the spark gap and the glow of the tube with one coil could be compared with the glow given by another coil. I have not illustrated the arrangement with a neon tube because that is well known to those familiar with testing apparatus.

In Fig. 3 I indicate a wiring diagram for conducting a similar test, using the parts of the engine in which the coil to be tested is ordinarily used, instead of the separate breaker mechanism used in the test above described. The coil is thus tested under the customary operating conditions and the master coil can be alternated instantaneously to check up on the operation of the engine with the master coil and with the engine coil.

In this test a slightly different hook up is used. 67 indicates the car battery which is connected in ordinary operation of the engine by the connection 68 which is shown in dotted lines. This connection is removed and a connection 69 is made from the battery to the switch member 140, which is comparable to the member 40 described above. Connection is made from the pole 142 of this switch by means of the wire 157 to one end of the primary 156 of the car coil to be tested. Pole 143 of the switch is connected by wire 152 to one end of the primary 153 of the master coil.

In Fig. 3 I show the other end of the primary 156 of the car coil connected by wire 70 to the breaker mechanism of the car, which is indicated as 103. This wire 70 takes the place of the ordinary connection 71 which is indicated in dotted lines as having been removed for the purposes of the test. The battery 67 and the breaker 103 are both indicated as grounded by a conventional symbol. The primary 153 of the master coil has its other end connected by wire 72 to the same breaker mechanism 103 so that by operation of the switch member 140 the primaries of the coil to be tested and the master coil can be alternately thrown selectively into circuit with the breaker 103 and the battery 67.

In ordinary operation the secondary 150 of the coil to be tested is connected by wire 73, shown in dotted lines, to the distributor 74 which is connected to spark plugs 75, which are shown diagrammatically. In carrying out the test the connection 73 is removed and the secondary 150 is connected by a wire 124 to the pole 120 of a switch 118 which is comparable with the switch 18 above described. The pole 119 of this switch is connected by wire 123 to the secondary 149 of the master coil. The switch member 121 of the switch 118 is connected to an adjustable spark gap 102 which is grounded by connection 76 through the distributor mechanism 74 and the spark plugs 75.

As will be understood, this test is conducted in a manner substantially similar with the above test. The internal combustion engine is started after the connections have been made as described and the engine is run at constant speed. The tester then throws the switch to selectively connect with the master coil and then the coil to be tested in the circuit with the engine to compare operation of the engine with the different coils. The comparison can be made very easily because the coils are in identical circuit with the engine and the alternation of the coils can be done instantaneously so that a study of the operation of the engine can be made and the comparison can be made simply and easily without carrying the operation in the memory of the tester while a master coil is being inserted in the engine.

I have indicated that the adjustable spark gap 102 be placed in circuit for this test. This is so that by adjusting the gap to see how large a gap can be utilized while the engine is running, the tester can determine how much high tension current is delivered by the coils in excess of the amount actually required to run the engine. It will be understood that a neon tube could be operated with the adjustable gap, and it will be understood that the gap can be eliminated from the circuit without departing from my invention and that the apparatus and method can be used for testing the operation of the engine and comparing it while alternating the coils. It will also be recognized that in conducting this test, if the master coil does not produce satisfactory results, a check is given to indicate that the difficulty in operation of the engine may lie in some other part rather than in the coil.

I have not illustrated the parts of the engine but those skilled in the art will be familiar with the mechanics of making the connection referred to and illustrated in the diagram of Fig. 3.

I have stated that in conducting the test the engine or the motor is run at constant speed. This is for testing the coil under a given situation and it will be understood that the test should be conducted with the engine or the breaker mechanism operating at different speeds to cover the complete series of conditions under which the coil is expected to operate. It would be desirable to test the coil against the master coil while the engine is being started, and in conducting the test first described a somewhat similar test can be obtained by testing the coils while the breaker mechanism is operating at slow speeds and the voltage from the battery is reduced to four volts, as has been mentioned above. It is also desirable in testing the coil under my method to make comparative tests of the operation of the coil when the throttle is open wide to speed up the engine from a low speed to a higher speed, because this gives a condition of high compression and full charge in the cylinder of the engine while the ignition system is operating at low speed.

While I have described my invention in the form preferred I am aware that it is capable of modification and variation by those skilled in the art and I wish to claim the same broadly as well as specifically, as in the appended claims.

Having thus described my invention, what I claim as new and desire to secure by Letters Patent is:

1. An apparatus for testing the ignition coil of an automobile comprising a source of electrical energy, a breaker mechanism and a two-way selective switch in circuit relationship, a master coil of a type substantially identical with the coil to be tested, primary connecting means connecting the primary of the master coil to one pole of said switch and means substantially identical with said primary connecting means for connecting the primary of the coil to be tested to the other pole of said switch whereby said primaries may be interchanged in substantially identical circuit relationship with said breaker and said source of electrical energy, means for driving said breaker mechanism, a spark gap, a second selective two-way switch in circuit with said spark gap, secondary connecting means connecting the secondary of said master coil to one pole of said selective switch, means substantially identical with said secondary connecting means to connect the other pole of said second switch to the secondary of the coil to be tested, whereby either secondary may be thrown into substantially identical circuit relationship with said spark gap, means for simultaneously throwing said switches while said breaker mechanism is in operation and the coil to be tested is in circuit relationship, whereby the primary and secondary of either said master coil or said coil to be tested may be alternately thrown into substantially identical circuit relationship with said devices instantly, whereby comparison of the length and characteristics of the sparks delivered by said master coil and said coil to be tested may be compared.

2. An apparatus for testing the ignition coil of an automobile comprising a source of electrical energy, a breaker mechanism and a two-way selective switch in circuit relationship, a master coil of a type substantially identical with the coil to be tested, primary connecting means connecting the primary of the master coil to one pole of said switch and means substantially identical with said primary connecting means for connecting the primary of the coil to be tested to the other pole of said switch whereby said primaries may be interchanged in substantially identical circuit relationship with said breaker and said source of electrical energy, means for driving said breaker mechanism, an indicator means to determine the characteristics of the high tension current from the secondary of a spark coil, a second selective two-way switch in circuit with said indicator means, secondary connecting means connecting the secondary of said master coil to one pole of said selective switch, means substantially identical with said secondary connecting means to connect the other pole of said second switch to the secondary of the coil to be tested, whereby either secondary may be thrown into substantially identical circuit relationship with said indicator means, means for simultaneously throwing said switches while said breaker mechanism is in operation and the coil to be tested is in circuit relationship, whereby the primary and secondary of either said master coil or said coil to be tested may be alternately thrown into substantially identical circuit relationship with said devices instantly, whereby comparison of the characteristics of the sparks delivered by said master coil and said coil to be tested may be compared.

3. An apparatus for testing ignition coils of an automobile comprising a master coil of a type substantially identical with the coil to be tested, a two-way switch having one pole connected by a connection to the secondary of said master coil and the other pole having a connection substantially identical with the connection between the other pole of said switch and said master coil adapted to be connected to the secondary of a coil to be tested, whereby either of said secondaries may be thrown selectively into identical circuit with the distributor of an internal combustion engine, and means for connecting said switch to such a distributor, a second two-way switch having one pole connected by a connection to the primary of said master coil and the other pole having connections substantially identical with the connections between the other pole of said switch and said master coil to be connected to the primary of the coil to be tested, whereby either of said primaries may be thrown selectively into identical circuit with the breaker and battery of an internal combustion engine, means for connecting said switch in circuit relationship with such a breaker and battery, and means for simultaneously throwing said switches while the engine is in operation, whereby the primary and secondary of either said master coil or said coil to be tested may be alternately thrown instantly into identical circuit with said engine whereby comparison of the operation of the engine while using either coil may be made.

4. An apparatus for testing the ignition coil of an automobile comprising a source of electrical energy, a breaker mechanism and a two-way selective switch in circuit relationship, a master coil of a type substantially identical with the coil to be tested, primary connecting means connecting the primary of the master coil to one pole of said switch and means substantially identical with said primary connecting means for connecting the primary of the coil to be tested to the other pole of said switch whereby said primaries may be interchanged in substantially identical circuit relationship with said breaker and said source of electrical energy, means for driving said breaker mechanism, a spark gap, a second selective two-way switch in circuit with said spark gap, secondary connecting means connecting the secondary of said master coil to one pole of said selective switch, means substantially identical with said secondary connecting means to connect the other pole of said second switch to the secondary of the coil to be tested, whereby either secondary may be thrown into substantially identical circuit relationship with said spark gap, said switches being arranged so that they may be thrown simultaneously while said breaker mechanism is in operation and the coil to be tested is in circuit relationship, whereby the primary and secondary of either said master coil or said coil to be tested may be alternately thrown into substantially identical circuit relationship with said devices instantly, whereby comparison of the length and characteristics of the sparks delivered by said master coil and said coil to be tested may be compared.

5. An apparatus for testing ignition coils of an automobile comprising a master coil of a type substantially identical with the coil to be tested, a two-way switch having one pole connected by a connection to the secondary of said master coil and the other pole having a connection substantially identical with the connection between the other pole of said switch and said master coil adapted to be connected to the secondary of a coil to be tested, whereby either of said secondaries may be thrown selectively into identical circuit with the distributor of an internal combustion engine, and means for connecting said switch to such a distributor, a second two-way switch having one pole connected by a connection to the primary of said master coil and the other pole having connections substantially identical with the connections between the other pole of said switch and said master coil to be connected to the primary of the coil to be tested, whereby either of said primaries may be thrown selectively into identical circuit with the breaker and battery of an internal combustion engine, means for connecting said switch in circuit relationship with such a breaker and battery, said switches being arranged so that they may be thrown simultaneously while the automobile is in operation, whereby the primary and secondary of either said master coil or said coil to be tested may be alternately thrown instantly into identical circuit with said engine whereby comparison of the operation of the engine while using either coil may be made.

6. The method of testing an ignition coil of an internal combustion engine, comprising selectively first energizing either the coil under test or a master coil of a type substantially identical with the coil under test and discharging it through a spark gap and then substantially instantaneously identically energizing the other of said coils and discharging it through the identical spark gap, and comparing the characteristics of the sparks produced by the different coils.

7. The combination with ignition coils having primary and secondary windings, of a circuit breaker, battery and a switch, and conductors for connecting them in circuit with the primary winding of either coil, means forming a visible spark gap, and means for connecting the spark gap in a single circuit with the secondary winding of either coil and quickly substituting one coil for the other, said connecting means being operable with the switch to also open and close the circuit including the secondary winding as the switch is operated.

8. An apparatus for testing ignition coils by rapidly substituting one for the other comprising an adjustable visible spark gap, a circuit breaker, a battery, a switch, pair of spaced apart contacts, a conductor connected to the spark gap and carried by the switch and movable with it, a pair of ignition coils having primary and secondary windings, conductors for connecting the primary windings selectively in connection with the switch, the circuit breaker, and the battery in series, and conductors for connecting the secondary windings of the coils to the spaced contacts whereby either one of the secondary coils will be connected in a single circuit with the spark gap, depending upon the position of the switch.

9. The method of testing an ignition coil of an internal combustion engine, comprising operating the engine either with a master coil of a type substantially identical with the coil under test or with a coil to be tested electrically connected in the ignition system of said engine and substantially instantaneously disconnecting the coil connected to said ignition system, and identically connecting in its place in the identical circuit the other of said master coil or said coil to be tested without stopping the engine, and comparing the operation of the engine produced by the different coils.

10. The method of testing an ignition coil of an internal combustion engine, comprising selectively first energizing either the coil under test or a master coil of a type substantially identical with the coil under test and discharging it through the spark plugs of an internal combustion engine by connecting said coil in operative relationship with the ignition circuit of said engine and operating said engine and then substantially instantaneously identically energizing the other of said coils and discharging it through the identical spark plugs of the identical engine by identically connecting said coil in operative relationship with the ignition circuit of said engine and operating said engine to operate said engine uninterruptedly, and comparing the operation of the engine produced by the different coils.

11. The method of testing an ignition coil of an internal combustion engine, comprising selectively first energizing either the coil under test or a master coil of a type substantially identical with the coil under test and discharging it into the ignition distributing system of an internal combustion engine to operate said engine and then substantially instantaneously identically energizing the other of said coils and discharging it identically into the identical ignition distribution system of the identical internal combustion engine to operate said engine without interruption and comparing the operation of the engine produced by the different coils.

12. A device for testing an ignition coil for an internal combustion engine, said ignition coil having primary and secondary windings, comprising a standard coil substantially identical in type with the ignition coil, and means comprising conductors and a multiple contact switch for substantially instantaneously substituting the standard coil windings for the corresponding ignition coil windings in otherwise identical circuits, whereby indicating means operatively associated with the identical circuits afford comparative indication of the condition of said ignition coil relatively to said standard coil.

13. A device for testing an ignition coil for an internal combustion engine, said ignition coil having primary and secondary windings, comprising a standard coil substantially identical in type with the ignition coil, visible spark gap indicating means for connection in circuit with the secondary of either coil, and means comprising conductors and a multiple contact switch for substantially instantaneously substituting the standard coil windings for the corresponding ignition coil windings in otherwise identical circuits, whereby said spark gap affords visible comparative indication of the condition of said ignition coil relative to said standard coil.

14. An ignition coil tester for comparatively testing the primary and secondary windings of two coils, comprising a circuit breaker and means forming an adjustable visible spark gap; a source of current supply; circuit connections providing an identical circuit including the source of current supply and the circuit breaker for either primary winding, and an identical circuit for either secondary winding, the circuit for the secondary winding also including the spark gap; and means for connecting the windings of either coil in the said circuits and rapidly substituting the windings of the other coil therefor, so that the variation between the spark characteristics of the two coils may be easily observed, and the sparks compared.

15. The method of testing an ignition coil of an internal combustion engine, comprising selectively first energizing either the ignition coil or a standard coil of a type substantially identical with the ignition coil and discharging it through a spark gap, then terminating such energizing and discharging, and immediately and identically energizing the other of said coils and discharging it through the identical spark gap, and comparing the characteristics of the sparks produced by the different coils.

16. The method of testing and comparing ignition coils having primary and secondary windings, which comprises including either primary winding in a single circuit including a battery, a circuit breaker and a switch, including the corresponding secondary winding in a single circuit in series with a visible adjustable spark gap and a second switch, and operating the two switches simultaneously and rapidly to throw the primary of the other coil in circuit and to connect the secondary coil thereof through the spark gap to substitute one coil for the other whereby the performance of the spark coils can be compared under the same conditions to observe the differences in the sparks.

GERALD H. ALLEN.